March 6, 1951  E. SCHNELL  2,544,050

RETRACTABLE WHEEL LUG

Filed March 26, 1949

INVENTOR
EFFNER SCHNELL

BY

ATTORNEYS

Patented Mar. 6, 1951

2,544,050

UNITED STATES PATENT OFFICE 2,544,050

RETRACTABLE WHEEL LUG

Effner Schnell, Brillion, Wis.

Application March 26, 1949, Serial No. 83,545

2 Claims. (Cl. 301—47)

My invention refers to tractor wheels, and it has for its object to provide a simple and effective series of traction teeth, associated with the wheel tire, whereby the traction of a vehicle is materially increased under working conditions in soft soil, and the life of the tire is also lengthened.

A further object of my invention is to provide a tooth carrying ring attachable to the wheel rim, the teeth being manually actuated to swing downwardly clearer of the ground engaging line of the tire when the wheel is traveling from place to place upon hard surfaced roads to prevent the teeth grinding away when the vehicle is idling. The device includes a rotatable ring for actuating the teeth, whereby the same are elevated above the tire tread or depressed below the same, the said ring being locked in either position.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
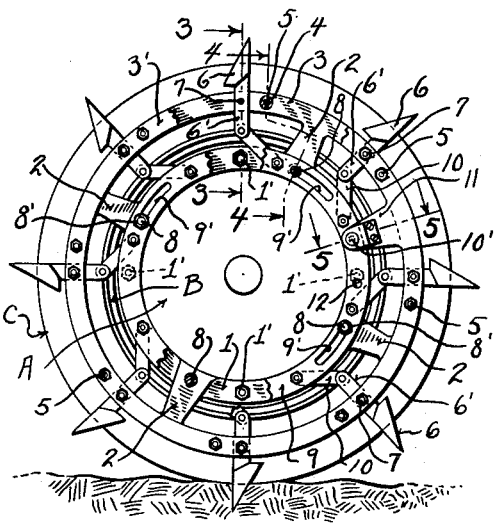
Figure 1 represents a side elevation of a tractor or other vehicle wheel equipped with traction teeth, embodying the features of my invention, the same being shown in their traction or working position.

Referring by characters to the drawings, A indicates a wheel disc carrying a tire rim B, having mounted thereon a pneumatic tire C, all of which parts are of standard type.

The tire rim B has fitted thereto a wheel attaching ring I by bolts I'. The wheel attaching ring has extending upwardly therefrom arms 2, which arms are merged into a tooth carrying ring 3, the same having associated therewith a companion ring 3', which ring is spaced from the ring 3 by thimbles 4 and bolts 5. The said rings 3 and 3' being practically a single element to be hereinafter referred to as a "wheel attaching ring," which ring is in juxtaposition to one side of the tire and below the tread thereof.

Mounted between the rings 3 and 3' is a series of traction teeth 6 having depending legs 6' which are pivotally mounted between the rings 3 and 3' by bolts 7.

Figure 2:
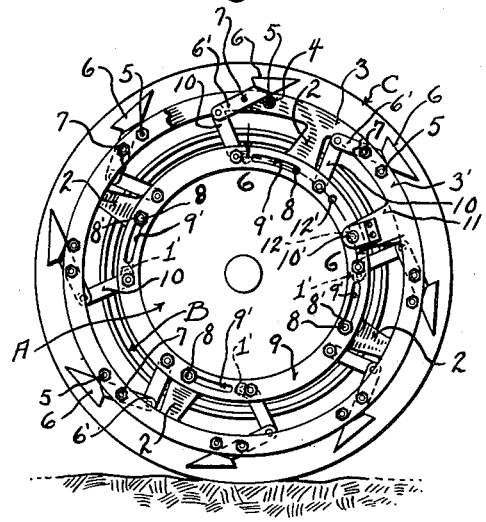
Figure 2 is a similar side elevation showing the teeth retracted below the tread of the tire.
Figure 3:
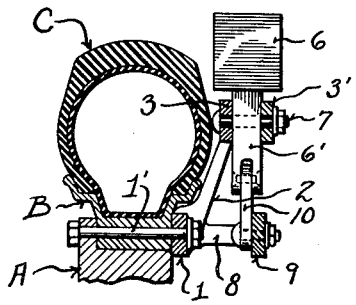
Figure 3 is an enlarged detailed cross sectional view through the tire and traction tooth attachment, the section being indicated by line 3—3 of Figure 1.
Figure 4:
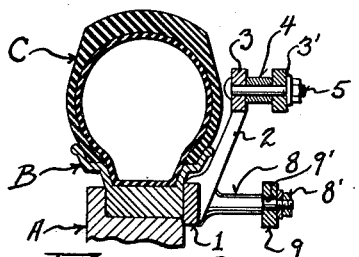
Figure 4 is a similar cross sectional view upon a different plane, the view being indicated by line 4—4 of Figure 1.
Figure 6:
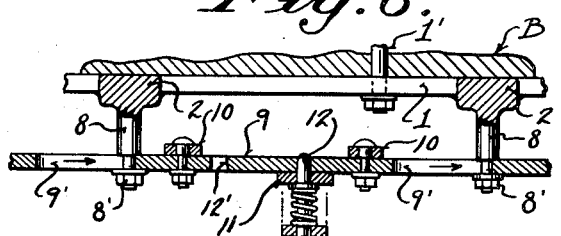
Figure 6 is a plan sectional view particularly illustrating the means for locking a tooth actuating ring in its two positions.
Figure 5:
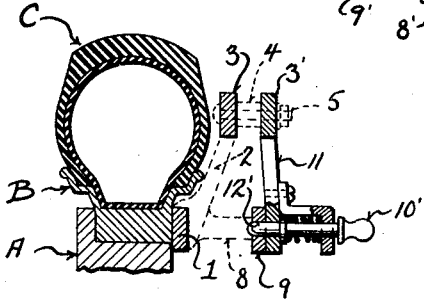
Figure 5 is another cross sectional view through the tire and associated parts, the section being indicated by line 5—5 of Figure 1.

When the traction teeth are depressed, as shown in Figure 2 of the drawings, the legs 6' engage the thimbles 4 to limit their movement.

The wheel attaching ring I has extended therefrom a series of studs 8 and mounted upon the ends thereof is a tooth actuating ring 9 having a series of arcuate slots 9' therein, which slots engage the ends of the stud 8 and are held in such engagement by nuts 8', which engage thread ends of the studs.

The ends of the traction tooth leg 6' have pivoted thereto a series of links 10, the opposite ends of which links are pivotally connected to the rotatable tooth actuating ring 9.

From the foregoing description, it is apparent when the teeth are swung outwardly to their functioning or traction position above the tread of the wheel, due to their link connection with the actuating ring, they are locked in said position by a spring controlled plunger 10'. The plunger is mounted upon a depending ear 11 of the tooth carrying ring 3', it being understood that the inner end of the plunger selectively engages locking apertures 12—12' of the rotatable tooth actuating ring 9.

Hence, when the tooth actuating ring 9 is rotated in one position upon the studs 8, it is limited by engagement of one end of the slots 9', and when rotated in the opposite direction, the teeth are depressed as shown in Figure 2 of the drawings and locked in said position by engagement of the plunger 10' with the aperture 12 of the tooth actuating ring 9.

Thus, by simply rotating the tooth actuating ring back and forth and locking it in either position, the teeth may be extended upwardly beyond the tread of the wheel or contacted below said tread, whereby the tractor or other vehicle may effectually be driven upon soft ground or a hard surface road without injury to the teeth.

I claim:

1. In a tractor or other vehicle wheel having a rim and a pneumatic tire carried thereby; a traction attachment comprising a wheel ring secured to the rim, arms extending upwardly from the wheel ring, a tooth carrying ring secured to the arms, traction teeth having legs pivoted to the tooth carrying ring, studs extending from the wheel ring, a rotatable tooth actuating ring having arcuate slots therein engaging the studs of the wheel ring, links connecting the rotatable tooth actuating ring and the legs of the traction teeth, and locking means carried by the tooth carrying ring engaging the tooth actuating ring for holding the tooth actuating ring in two positions, limited by the ends of arcuate slots, whereby the traction teeth are held above the tread of the tire or below said tread.

2. In a tractor or other vehicle wheel having a rim and a pneumatic tire carried thereby; a traction attachment comprising a wheel ring secured to the rim, arms extending upwardly from the wheel ring, a tooth carrying ring mounted upon the arms, a second tooth carrying ring spaced from the first mentioned tooth carrying ring and secured thereto, a series of traction teeth having depending legs fitted between the spaced rings and pivoted thereto studs extending from the wheel ring, a rotatable tooth actuating ring having arcuate slots and spaced locking apertures therein, the arcuate slot engaging the studs of the wheel carried ring, links connecting the rotatable tooth actuating ring and the legs of the traction teeth, means for locking the said rotatable ring in two positions, the locking means including an ear depending from the tooth carrying ring, and a spring plunger carried by the ear, engageable with the spaced locking apertures of the rotatable tooth actuating ring.

EFFNER SCHNELL.

REFERENCES CITED

The following references are of record in the file of this patent:

UNITED STATES PATENTS

| Number | Name | Date |
| --- | --- | --- |
| 1,015,545 | Craig | Jan. 23, 1912 |
| 1,376,896 | Noah | May 3, 1921 |